United States Patent Office

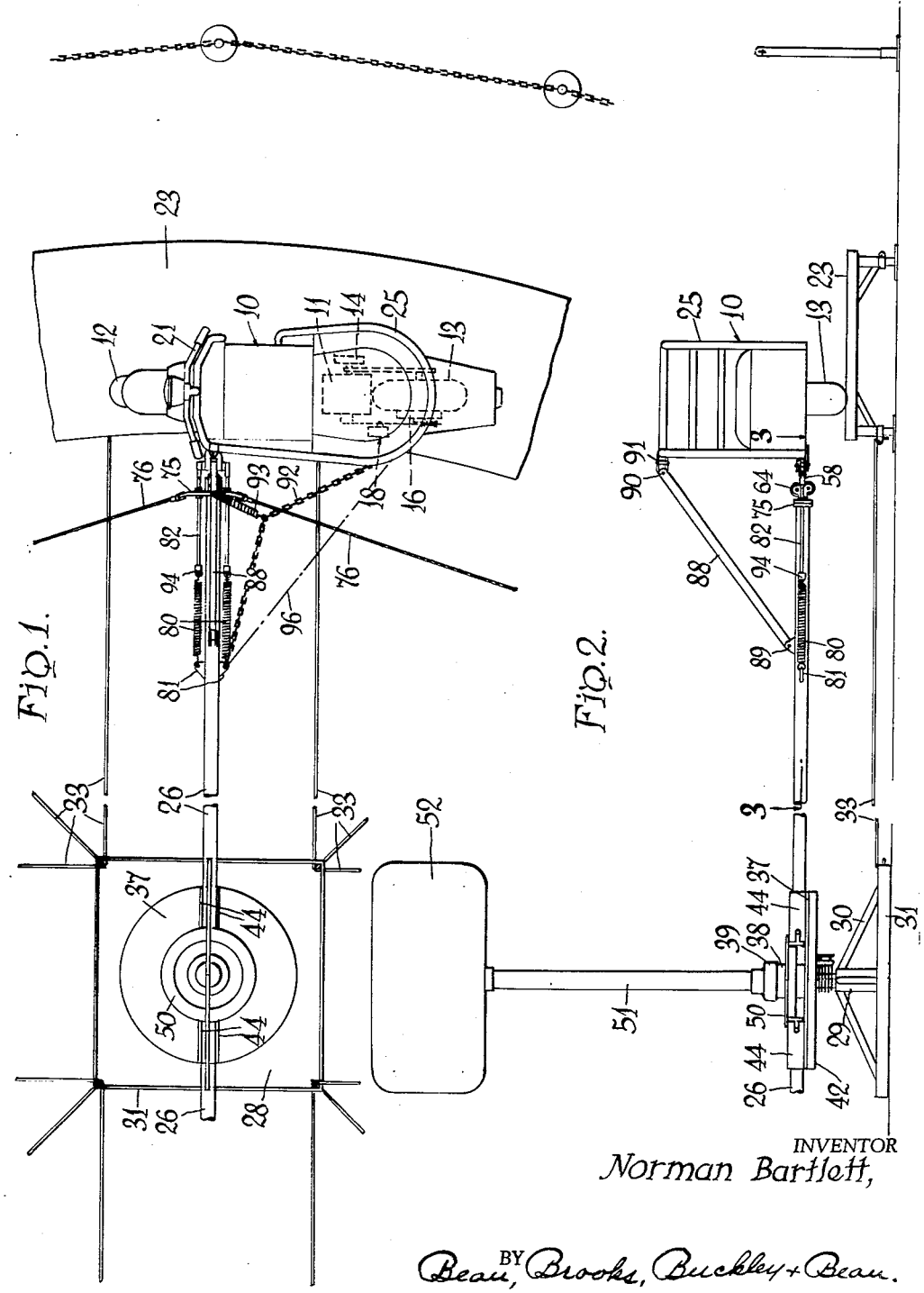

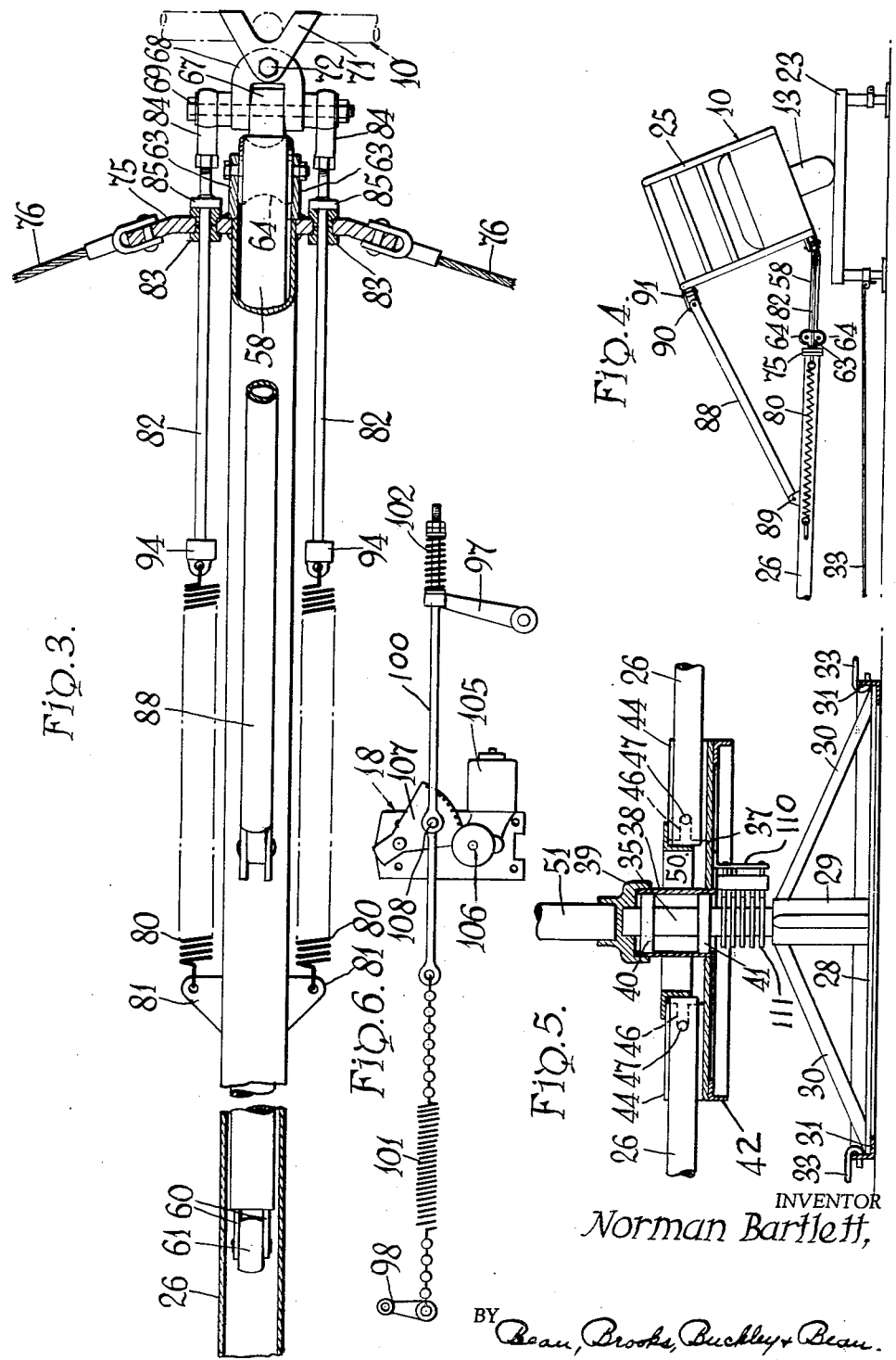

3,006,642
AMUSEMENT RIDE
Norman Bartlett, 915 NE. 173rd St., North Miami Beach, Fla., assignor of one-half to Marjorie Bartlett, North Miami Beach, Fla.
Filed Oct. 9, 1959, Ser. No. 845,344
6 Claims. (Cl. 272—34)

This invention relates to amusement rides and more particularly to amusement rides of the roundabout type.

The amusement ride of the present invention is of the general type wherein a circular series of passenger carriers traverses a continuous circular pathway with each carrier connected by means of radiating arm means with a central rotatable support and with means for maintaining uniform spacing between the cars or carriers. The passenger carriers may be propelled in various ways but in the present instance independent motors are provided in some or all of the passenger carriers to actuate or propel the series of carriers as a unit.

The carriers themselves comprise cars or vehicles of the velocipede or scooter type which are supported on a pair of fore and aft ground wheels, at least one of which comprises a motor driven traction wheel for propelling the car or carrier. The cars or their restraining arms are so interconnected circularly that the cars maintain an equal spacing about the circular series.

The present invention is concerned primarily with a car supporting or restraining arrangement whereby the cars bank in varying degrees in proportion to their speed and, particularly in velocipede type vehicles, the actual movement of a motorcycle or bicycle around a circular track is realistically simulated in a very simple, safe and effective manner.

The various objects and advantages of the present invention, in addition to the primary object set forth broadly above, will be more clearly evident to those skilled in the amusement ride art from a consideration of the embodiment of the ride of the present invention illustrated in the accompanying drawings and described in detail in the following specification. However, it is to be understood that such embodiment is set forth by way of example only and that the principles of the invention are not limited to the particular exemplary ride thus set forth nor otherwise than as defined in the appended claims.

In the drawings:

FIG. 1 is a fragmentary top plan view of a portion of one form of the ride of the present invention;

FIG. 2 is an elevational view, likewise fragmentary, of the portion of the ride structure illustrated in FIG. 1;

FIG. 3 is a fragmentary top plan view, on a larger scale, of the outer end portion of one of the radiating car restraining and guiding arms of the ride illustrated in FIGS. 1 and 2;

FIG. 4 is a fragmentary elevation view similar to FIG. 2, showing the outer portion of the structure of FIG. 2 with the passenger carrier thereof in a different operating position;

FIG. 5 is a fragmentary elevation view showing the central portion of the ride of FIGS. 1 and 2 but on a larger scale and with portions thereof shown in cross section for added illustration; and FIG. 6 is a fragmentary elevational view of a control arrangement for the motive means and brakes of the passenger carriers.

Like characters of reference denote like parts throughout the several figures of the drawings and, referring particularly to FIGS. 1 and 2, the numeral 10 designates generally one of the passenger carriers which in the present invention comprises two-wheeled devices similar to a motorcycle or motor scooter. In fact, I have found that the ride of the present invention may be constructed with economy and effectiveness by employing actual commercially available motor scooters which are powered with small gasoline engines as indicated at 11 in FIG. 1.

The carriers 10 are mounted on front and rear ground wheels designated 12 and 13, respectively, and motive power is transmitted from engine 11 to rear wheel 13 by way of an automatic centrifugal clutch 14. Rear wheel 13 is also provided with a conventional brake indicated at 16 in FIG. 1 and control means for the engine throttle and the brake mechanism is indicated generally by the numeral 18 in FIG. 1. This control means is shown in elevation on a considerably enlarged scale in FIG. 6.

In FIG. 1 the numeral 21 indicates the conventional handle bar of a motor scooter which is disconnected from the front wheel 12 and is a mere dummy as employed herein. The carrier 10 is guided for circular movement about a circular platform 23 by radiating arm means presently to be described. Apart from the guiding effect of the arm means, the carrier 10 is self steering and maintains proper alignment along its circular path by the self-tracking effect of the usual caster mounting of the front wheel 12.

In addition to the foregoing, the motor scooters employed as passenger carriers herein are preferably further modified by the addition of a protective railing type of passenger enclosure or guard indicated at 25 in FIGS. 1 and 2. A pair of tandem seats are preferably utilized although other seating arrangements may be employed if desired.

Each of the carriers 10 is connected to the outer end of a radiating arm 26, the several arms 26 being pivotally connected to a central rotatable support best shown in FIG. 5, and reference will now be had to FIG. 5 for a further description of such rotatable support. A square central base plate 28 has fixed thereto a central upright bearing 29 which may be braced by struts 30 welded to the upper portion of bearing 29 and the margins of plate 28. In addition, base plate 28 has angle bars 31 fixed about its edges to provide anchorage for a system of bracing rods.

Referring particularly to FIG. 1, a series of stay bars or bracing rods 33 are hooked or otherwise attached at their inner ends to the angle bars 31 and are secured at their outer ends to portions of platform 23. Thus platform 23 and base plate 28 are maintained in concentric relationship and against relative shifting in a circumferential direction since the illustrated arrangement of the stay bars 33 fixes the base plate and platform against any relative movement in a horizontal plane in the same manner as the spokes of a conventional wire wheel. At the same time, the stay bars 33 are readily releasable to render the ride structure readily disassembled and conveniently portable.

A pivot shaft 35 is fixed to and extends upwardly from bearing 29 and, referring again particularly to FIG. 5, the rotatable structure mounted thereon will now be described. A circular support plate 37 has fixed centrally thereof a bearing sleeve 38 which includes an upper cap member 39. Sleeve 38 is rotatably mounted on pivot shaft 35 by means of anti-friction bearings 40 and 41. Support plate 37 may be reinforced by a ring 42 of angular cross section, as clearly shown in FIG. 5.

It is to be understood that the number of carriers 10 may vary although in the specific ride being described herein by way of example, ten carriers are contemplated which are connected to the outer ends of a series of ten equally spaced radiating arms 26, although only two such arms are illustrated in FIGS. 1 and 2, for the sake of simplicity, and means for pivotally attaching the inner ends of ten such arms to support plate 37 are provided, although only two such attachments are illustrated in FIGS. 1, 2 and 5.

Referring to FIGS. 1 and 5, particularly the latter, each arm attachment comprises a pair of spaced plates 44 welded or otherwise fixed vertically edgewise to the upper surface of support plate 37 and extending in a radial direction. The plates 44 are spaced to receive the inner ends of the arms 26 and, as shown in FIG. 5, the inner edges of plates 44 are slotted as at 46 and the inner ends of the radiating arms 26 are provided with oppositely projecting cross pins or trunnions 47 which bear pivotally in the slots 46 as clearly shown in FIG. 5.

A loose ring member or retainer 50 of angular cross section rests on the tops of the bearing plates 44 and extends within the space between the inner ends of the several arms 26 to prevent radially inward disassembling movement thereof. When the ride is being dismantled the ring 50 is merely lifted from the position illustrated in FIG. 5, whereupon each arm 26 may be moved radially inwardly thence upwardly to disassemble it from the bearing plates 44. As shown in FIG. 2, a post 51 may be mounted on the rotary sleeve and cap 38, 39 for supporting a display panel 52 which may bear the name of the ride or other indicia or information.

Reference will now be had to the portion of the arm and carrier structure which is particularly novel to the present invention and produces a novel ride result, namely, the illusion or impression of actually riding or driving a velocipede type vehicle in a banked position and at substantial speed about a circular track or pathway. To this end means are provided which cause the vehicle to bank or incline in the manner of a cycle or velocipede traveling a curving course, the degree of bank produced by the means of the present invention being directly proportioned to the speed of the vehicle, as actually occurs in riding a bicycle or motorcycle.

Each of the several radiating arms 26 is of circular tubular cross section, in the present illustrative example, and a telescoping tubular member 58 extends into the outer end thereof as illustrated in FIG. 3. In order that the telescoping member 58 may move freely into and outwardly of the arm 26 in a lengthwise direction a roller support therefor is provided. A pair of bearing plates 60 are welded or otherwise fixed to the inner end of member 58 and a roller 61 is supported for free rotation therebetween. Roller 61 may be approximately spherical in form to roll freely along the inner periphery of radiating arm 26.

A pair of outwardly projecting bearing plates 63 are welded to the outer end of each of the radiating arms 26 and, as shown in FIGS. 2 and 4, a pair of vertically spaced rollers 64 are rotatably supported between the bearing plates 63. These rollers are of convex periphery or hourglass form whereby the telescoping member 58 is freely guided therebetween for longitudinal movement with respect to tubular arm member 26.

The outer end of each telescoping member 58 has fixed thereto a bearing 67 which is pivotally connected to a clevis 68 by a nut and bolt assembly 69, all as clearly shown in FIG. 3. The axis of bolt 69 is horizontal and the clevis is in turn pivoted to a bracket 71 on a vertical axis by means of a pivot screw 72. Bracket 71 is fixed to the lower portion of carrier 10 and thus carrier 10 is connected to the outer end of telescoping member 58 for universal pivotal movement.

A bracket plate 75 is fixed transversely to the outer end of each of the radiating arms 26 as shown in FIG. 3 and cables 76 connect between each side of bracket plate 75 and a similar bracket plate on the adjacent radiating arm 26, whereby the several radiating arms 26 are maintained at equal angles with respect to the other arms of the series.

Still referring particularly to FIG. 3, extension coil springs 80 extend along each side of each of the radiating arms 26 and are attached at their inner ends to lugs 81 fixed to opposite sides of the arms 26. The outer ends of the springs 80 attach to spring rods 82 which pass slidably through bushings 83 carried by the bracket plates 75 and are adjustably attached at their outer ends to the pivot bolt 69 by means of fittings 84. Collars 85 are fixed to the spring rods 82 outwardly of bracket plate 75 to limit inward sliding movement of the telescoping member with respect to each of the arms 26 as shown in FIG. 3 and thus establish the normal rest position or attitude of the carriers 10 as illustrated in FIG. 2.

Referring particularly to FIGS. 2 and 4, a distance or radius rod 88 is pivoted at one end to each of the radiating arms 26 as at 89 and the outer end of each distance rod 88 is attached to the upper portion of the associated carrier 10 by horizontal and vertical pivots designated 90 and 91, respectively, whereby the outer end of each distance rod 88 has universal pivotal connection with its associated carrier 10.

As the carriers are propelled along the platform 23 and they exert centrifugal force against the inward pull of the springs 80, the latter yield and the lower portions of the carriers 10 move outwardly in proportion to the degree of centrifugal force and, since the upper portions of the carriers are restrained by the distance rods 88, the cars tilt as shown in FIG. 4, which illustrates the limit position of such tilting. This limit position is established by a collar 94 on each spring rod 82 which abuts the bushing 83 of each spring rod bracket plate 75.

If the attachment points of the telescoping member 58 and the distance rod 88 are as illustrated in the drawing, that is at forward portions of the vehicle, best results are obtained from the standpoint of safety since the carriers are guided or towed in a manner so that even a tire blow-out or locking of a wheel will not cause the carrier to sharply change direction. However, with this generally forward point of connection of the arm means there is a tendency of the rear portions of the carriers to move radially outwardly as desired maximum operating speeds are attained.

Accordingly, resiliently flexible retaining means are preferably provided for preventing this undesirable outward movement of the rear portions of the carriers. As shown in FIG. 1, a flexible member 92 which may be in the form of a chain or the like, is attached at its opposite ends to one of the lugs 81 and to a rearward point along carrier 10. Flexible member 92 lies substantially in the same horizontal plane as telescoping member 58.

An extension coil spring 93 is attached at one end to a midpoint along flexible member 92 and at its other end to the top of bracket plate 75.

It will be seen from the foregoing, that flexible members 92 resiliently urge the rear portions of the carriers 10 radially inwardly toward the desired position illustrated in FIG. 1. The position of flexible member 92 in FIG. 1 is that which it assumes when there is no tendency of the rear portion of the carrier to move outwardly and the maximum outward position, against the resistance of spring 93, is attained when flexible member 92 extends in a straight line between its two end points of attachment, as indicated by the dot and dash line 96.

Reference will now be had to the throttle and brake control mechanism which has previously been generally designated by the reference numeral 18 in FIG. 1 and which is shown in greater detail in FIG. 6. In the latter figure the numeral 97 designates the usual brake operating arm of a motor scooter type vehicle with which the carrier 10 of the present embodiment is provided and the numeral 98 designates the fuel throttle control arm of engine 11.

Means for jointly shifting the throttle arm 98 and operating the brake arm 97 comprises a rod 100 which connects to throttle arm 98 by way of an extension coil spring 101 and extends through brake arm 97 to apply brake operating pressure thereto in one direction through a compression coil spring 102 in a conventional manner. Movement of rod 100 to the left as viewed in FIG. 6 closes the engine throttle and applies the brake and movement thereof to the right releases the brake and opens the engine throttle to varying degrees.

Means are provided for remote joint operation of the brakes and the throttles of the several engines by a ride operator. A servo unit for each throttle and brake combination comprises small reversible electric motor 105, having worm drive connection with a shaft 106, the latter having a pinion meshing with a pivoted sector gear 107 to which the shifting rod 100 is pivoted as at 108. The usual three wire control circuit for each reversible motor 105 leads from each carrier 10 inwardly along its radiating arm 26 and all of the sets of wires from the several motors 105 connect to a common brush unit 110 fixed to the under side of rotatable support plate 37. Distributor rings 111 are mounted upon the fixed central pivot shaft 35.

From three distributor rings 111 which connect with the motor circuit wires, control wires may lead to a reversing switch located at any desired point where the operator of the ride may have his station. In FIG. 5 five distributor rings and brush sections are shown; three are for the reversible motors 105 and the other two may be used for illuminating the display panel 52 or for other illumination of the rotatable portions of the ride or for any other desired purpose.

At the maximum operating speeds usually desired in the present ride, the power of all of the engines of the carriers 10 will not generally be required. Accordingly, the ride operator may start only every other engine 11 of the several carriers 10, say five engines when a total of ten are present. When used in this manner, one set of engines may be employed one day and the other the next day to distribute the wear more or less uniformly. This also provides an abundance of spare engines which are readily available in the case of engine breakdowns.

I claim:

1. In an amusement ride of the roundabout type, a relatively vertical central rotatable support, a plurality of arm means radiating therefrom, each arm means being pivoted to said central support for raising and lowering movement, a passenger carrier at the outer end of each arm means, said passenger carriers having fore and aft ground wheels, means for propelling said carriers around a generally circular path defined by said arm means, the outer portions of said arm means comprising a pair of arm portions, one of said arm portions being of relatively fixed length and the other arm portion being resiliently extensible, said arm portions being pivoted to each other about a horizontal axis, said fixed length arm portion being pivoted to the upper portion of the associated passenger carrier on a generally horizontal axis and the extensible arm portion being pivoted to a lower portion of said associated passenger carrier, whereby the lower portion of each passenger carrier may move outwardly to banked position under the influence of centrifugal force by resilient extension of said extensible arm portion and relative pivotal movements of said several pivotal connections.

2. In an amusement ride of the roundabout type, a relatively vertical central rotatable support, a plurality of arm means radiating therefrom, each arm means being pivoted to said central support for raising and lowering movement, a passenger carrier at the outer end of each arm means, said passenger carriers having fore and aft ground wheels, said front wheels having self-steering cycle type swivel mountings, means for propelling said carriers around a generally circular path defined by said arm means, the outer portions of said arm means comprising a pair of arm portions, one of said arm portions being of relatively fixed length and the other arm portion being resiliently extensible, said arm portions being pivoted to each other about a horizontal axis, said fixed length arm portion being pivoted to the upper portion of the associated passenger carrier on a generally horizontal axis and the extensible arm portion being pivoted to a lower portion of said associated passenger carrier, whereby the lower portion of each passenger carrier may move outwardly to banked position under the influence of centrifugal force by resilient extension of said extensible arm portion and relative pivotal movements of said several pivotal connections.

3. In an amusement ride of the roundabout type, a relatively vertical central rotatable support, a plurality of arm means radiating therefrom, each arm means being pivoted to said central support for raising and lowering movement, a passenger carrier at the outer end of each arm means, said passenger carriers having fore and aft ground wheels, means for propelling said carriers around a generally circular path defined by said arm means, the outer portions of said arm means comprising a pair of arm portions, one of said arm portions being of relatively fixed length and the other arm portion being resiliently extensible, said arm portions being pivoted to each other about a horizontal axis, said fixed length arm portion being pivoted to the upper portion of the associated passenger carrier on a generally horizontal axis and the extensible arm portion being pivoted to a lower portion of said associated passenger carrier, whereby the lower portion of each passenger carrier may move outwardly to banked position under the influence of centrifugal force by resilient extension of said extensible arm portion and relative pivotal movements of said several pivotal connections, and resiliently extensible restraining means connecting a point along each arm means inwardly of the pivotal connections of said arm portions to each other and a rear portion of the associated carrier.

4. In an amusement ride of the roundabout type, a relatively vertical central rotatable support, a plurality of arm means radiating therefrom, each arm means being pivoted to said central support for raising and lowering movement, a passenger carrier at the outer end of each arm means, said passenger carriers having fore and aft ground wheels, said front wheels having self-steering cycle type swivel mountings, means for propelling said carriers around a generally circular path defined by said arm means, the outer portions of said arm means comprising a pair of arm portions, one of said arm portions being of relatively fixed length and the other arm portion being resiliently extensible, said arm portions being pivoted to each other about a horizontal axis, said fixed length arm portion being pivoted to the upper portion of the associated passenger carrier on a generally horizontal axis and the extensible arm portion being pivoted to a lower portion of said associated passenger carrier, whereby the lower portion of each passenger carrier may move outwardly to banked position under the influence of centrifugal force by resilient extension of said extensible arm portion and relative pivotal movements of said several pivotal connections, and resiliently extensible restraining means connecting a point along each arm means inwardly of the pivotal connections of said arm portions to each other and a rear portion of the associated carrier.

5. In an amusement ride of the roundabout type, a relatively vertical central rotatable support, a plurality of arm means radiating therefrom, each arm means being pivoted to said central support for raising and lowering movement, a passenger carrier at the outer end of each arm means, said passenger carriers having fore and aft ground wheels, power means on said carriers for propelling the same around a generally circular path defined by said arm means, the outer portions of said arm means comprising a pair of arm portions, one of said arm portions being of relatively fixed length and the other arm portion being resiliently extensible, said arm portions being pivoted to each other about a horizontal axis, said fixed length arm portion being pivoted to the upper portion of the associated passenger carrier on a generally horizontal axis and the extensible arm portion being pivoted to a lower portion of said associated passenger carrier, whereby the lower portion of each passenger carrier may move outwardly to banked position under the influence of centrifugal force by resilient extension of said extensible arm portion and relative pivotal movements of said several pivotal connections.

6. In an amusement ride of the roundabout type, a relatively vertical central rotatable support, a plurality of arm means radiating therefrom, each arm means being pivoted to said central support for raising and lowering movement, a passenger carrier at the outer end of each arm means, said passenger carriers having fore and aft ground wheels, said front wheels having self-steering cycle type swivel mountings, power means on said carriers for propelling said carriers around a generally circular path defined by said arm means, the outer portions of said arm means comprising a pair of arm portions, one of said arm portions being of relatively fixed length and the other arm portion being resiliently extensible, said arm portions being pivoted to each other about a horizontal axis, said fixed length arm portion being pivoted to the upper portion of the associated passenger carrier on a generally horizontal axis and the extensible arm portion being pivoted to a lower portion of said associated passenger carrier, whereby the lower portion of each passenger carrier may move outwardly to banked position under the influence of centrifugal force by resilient extension of said extensible arm portion and relative pivotal movements of said several pivotal connections, and resiliently extensible restraining means connecting a point along each arm means inwardly of the pivotal connections of said arm portions to each other and a rear portion of the associated carrier.

References Cited in the file of this patent

UNITED STATES PATENTS

| | | |
|---|---|---|
| 1,729,379 | Garcia | Sept. 24, 1929 |
| 2,082,430 | Townsend | June 1, 1937 |
| 2,428,607 | Bartlett | Oct. 7, 1947 |
| 2,866,643 | Keefer et al. | Dec. 30, 1958 |